US009618377B2

(12) United States Patent
Weil et al.

(10) Patent No.: US 9,618,377 B2
(45) Date of Patent: Apr. 11, 2017

(54) METHODS AND APPARATUSES FOR DETERMINING THE VOLUME OF A SUBSTANCE IN A FLEXIBLE TANK

(71) Applicant: DRS Sustainment Systems, Inc., St. Louis, MO (US)

(72) Inventors: Roark D. Weil, St. Louis, MO (US); Matthew J. Hollander, St. Louis, MO (US); Asdrubal Garcia-Ortiz, St. Louis, MO (US); William F. Maciejewski, St. Louis, MO (US)

(73) Assignee: DRS Sustainment Systems, Inc., Saint Louis, MO (US)

(*) Notice: Subject to any disclaimer, the term of this patent is extended or adjusted under 35 U.S.C. 154(b) by 473 days.

(21) Appl. No.: 14/038,201

(22) Filed: Sep. 26, 2013

(65) Prior Publication Data

US 2015/0082877 A1    Mar. 26, 2015

(51) Int. Cl.
*G01F 17/00* (2006.01)
*G01F 22/00* (2006.01)

(52) U.S. Cl.
CPC .................................... *G01F 22/00* (2013.01)

(58) Field of Classification Search
CPC ............................. G01F 17/00; G01F 22/00
USPC .......................................................... 73/149
See application file for complete search history.

(56) References Cited

U.S. PATENT DOCUMENTS

| 4,553,216 | A | 11/1985 | Stevens et al. |
| 4,788,648 | A | 11/1988 | Ferretti et al. |
| 5,207,099 | A | 5/1993 | Baker |
| 5,369,223 | A * | 11/1994 | Berg, Jr. ............... G01G 5/04 177/208 |
| 5,386,736 | A * | 2/1995 | Spillman, Jr. ....... G01F 23/0076 73/149 |
| 5,660,478 | A * | 8/1997 | Alack ................ B65D 88/1631 206/597 |
| 5,859,366 | A * | 1/1999 | Van Driel ........... A61M 1/3624 73/149 |
| 6,577,960 | B1 | 6/2003 | Rabelo et al. |
| 6,670,601 | B1 | 12/2003 | Wyler |
| 6,892,572 | B2 | 5/2005 | Breed et al. |
| 7,225,671 | B2 | 6/2007 | Atkinson |
| 7,305,875 | B1 | 12/2007 | Pindus et al. |
| 7,376,495 | B2 | 5/2008 | Coggins et al. |
| 7,739,901 | B2 | 6/2010 | Wolford et al. |
| 8,181,516 | B2 | 5/2012 | Naydenov |
| 8,195,590 | B1 | 6/2012 | Coggins et al. |
| 8,281,655 | B2 | 10/2012 | Bahorich et al. |

(Continued)

*Primary Examiner* — Helen Kwok
*Assistant Examiner* — Nashmiya Fayyaz
(74) *Attorney, Agent, or Firm* — Kilpatrick Townsend & Stockton LLP

(57) ABSTRACT

A flexible storage container may have a first footprint when empty, and retracts to a second footprint when filled with a substance. A load sensing apparatus used for determining the volume of the substance in the flexible storage container can include a first set of load-sensitive sensors arranged in at least a region of the first footprint external to the second footprint, and a second set of load-sensitive sensors arranged within the second footprint. The sensor data from the load-sensitive sensors can be used to create a pressure level profile, and the volume of the substance contained in the flexible storage container can be calculated from the pressure level profile.

15 Claims, 7 Drawing Sheets

(56) References Cited

U.S. PATENT DOCUMENTS

| | | |
|---|---|---|
| 8,322,234 B2 | 12/2012 | Justak |
| 8,601,865 B2 * | 12/2013 | Justak .................... G01F 23/14 |
| | | 73/296 |
| 2012/0138779 A1 | 6/2012 | Martinez Valdegrama et al. |

* cited by examiner

= STATIC REGION OF FOOTPRINT

= VARIABLE REGION OF FOOTPRINT

METHODS AND APPARATUSES FOR DETERMINING THE VOLUME OF A SUBSTANCE IN A FLEXIBLE TANK

BACKGROUND

Bulk storage of liquids such as fuel and water relies for the most part on the use of bulk storage tanks. The bulk storage tanks can be deployed and set up at a location as needed, for example, in a battlefield, to provide a transportable distribution center for the stored substances. These tanks can vary in capacity, for example, from 3,000 gallons to 250,000 gallons, although smaller or larger tanks can be used. The substances stored in these tanks can be critical resources for the safety and lives of the infantry in the battlefield, and the volume of the substances in the tanks are constantly being monitor to ensure an adequate supply of resources is available when needed.

For bulk storage tanks with a rigid or fixed geometry, intrusive techniques such as immersing a level detection instrument into the tank can be used to detect the level of the liquid in the tank. Examples may include immersing a fiber optic cable, capacitive probe, or ultrasonic sensors into the tank. Based on the detected level of the liquid and the fixed tank geometry, the volume of the liquid contained in the tank can be computed. However, these intrusive techniques may require specially designed tanks or modifications to existing tanks. Furthermore, these techniques are suitable only for rigid or fixed geometry tanks, which can be bulky and cumbersome to transport.

For collapsible storage tanks that may not have a rigid or fixed geometry, one way of determining the volume of the substance in such a tank is to measure the height of the collapsible tank, and use a strap table to determine the fluid volume. However, such techniques require the strap table to be calibrated to the particular size and manufacturer of the collapsible tank, and is susceptible to inaccuracies due to changes in temperature. Furthermore, as the flexible tank ages and the material of the flexible tank warps and stretches out, periodic calibration of the strap table is also required. In some scenarios, a poorly calibrated strap table can result in up to a 30% measurement error.

Embodiments of the invention address these and other problems, individually and collectively.

BRIEF SUMMARY

A flexible storage container may have a first footprint when empty, and retracts to a second footprint when filled with a substance. According to various embodiments, a load sensing apparatus used for determining the volume of the substance in the flexible storage container can include a first set of load-sensitive sensors arranged in at least a region of the first footprint external to the second footprint, and a second set of load-sensitive sensors arranged within the second footprint. In some embodiments, a first spacing between an adjacent pair of load-sensitive sensors in the first set of load-sensitive sensors is less than a second spacing between an adjacent pair of load-sensitive sensors in the second set of load-sensitive sensors.

According to various embodiments, a system for monitoring and/or management of the substance stored in the flexible storage container can include at least a load sensing apparatus, a data collection unit, and a data processing unit. The load sensing apparatus can include a first set of load-sensitive sensors arranged in at least a region of the first footprint of the flexible storage container external to the second footprint of the flexible storage container, and a second set of load-sensitive sensors arranged within the second footprint of the flexible storage container. The data collection unit collects the sensor data from the first and second sets of load-sensitive sensors, and the data processing unit computes the volume of the substance using the collected sensor data. The results can be displayed locally or be transmitted to a remote location (e.g., a remote cloud).

According to various embodiments, the volume of a substance contained in a collapsible tank placed on a surface can be determined by receiving a first set of sensor data from load-sensitive sensors disposed on at least a first region of the surface and a second set of sensor data from load-sensitive sensors disposed on a second region of the surface, where the first region of the surface is covered by the collapsible tank when the collapsible tank is empty, and is exposed when the collapsible tank is full, and where the second region of the surface is covered by the collapsible tank when the collapsible tank is full. A pressure level profile of the collapsible tank can be determined using at least the second set of sensor data from the second set of load-sensitive sensors. The weight of the substance can be calculated using the pressure level profile, and the volume of the substance can be calculated using the weight and density of the substance.

DETAILED DESCRIPTION

Figure 1:
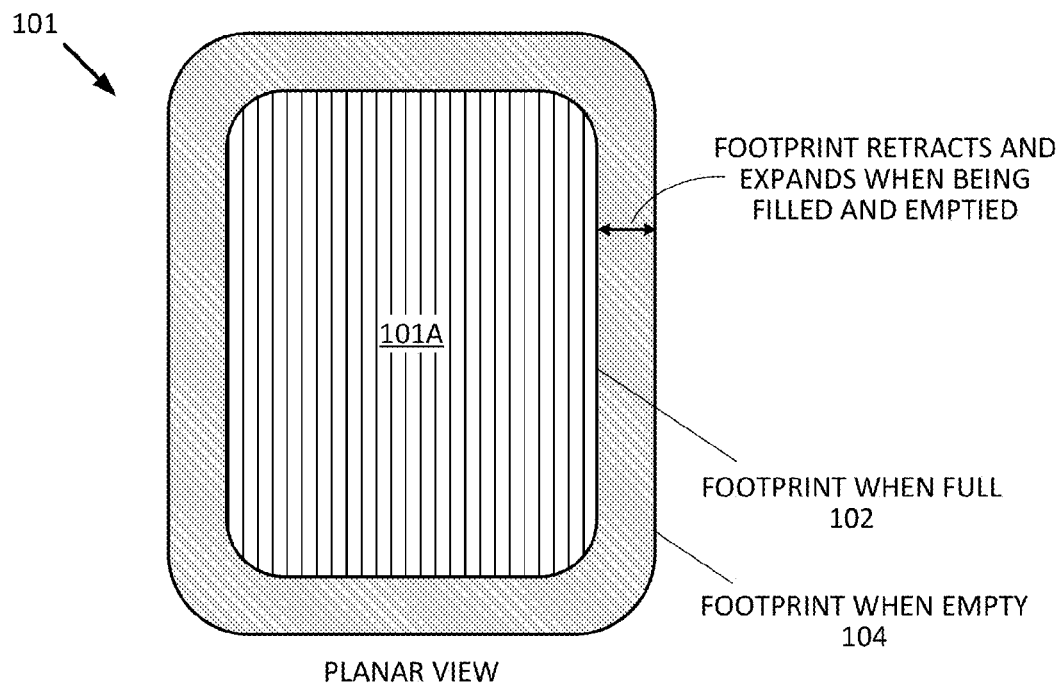
FIG. 1 illustrates various views of a flexible tank, according to some embodiments.
Figure 1:
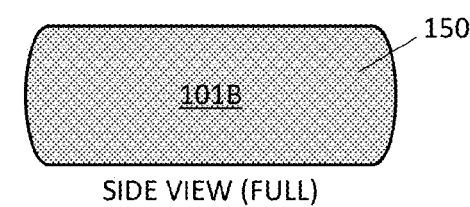
Figure 1:
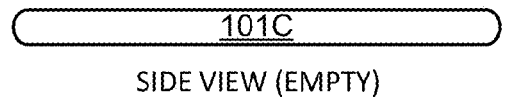

Embodiments of the present disclosure provide apparatuses and methods for determining the weight and volume of a substance in a flexible tank. As used herein, the terms "flexible tank," "flexible storage container," "collapsible tank," and "collapsible storage container" may be used interchangeably, and refer to a storage container (e.g., a bladder) in which the geometry or the body of the storage container varies or changes based on the volume of the substance contained in the storage container. The substance can be a liquid such as water or fuel, or any other liquid, chemical, or fluidic substance that can be stored in bulk in a flexible tank. In accordance with various embodiments, load-sensitive sensors are arranged for the most part under a flexible tank. The load-sensitive sensors are external to the flexible tank, and thus, the load-sensitive sensors are non-intrusive to the flexible tank, and the techniques described herein do not require any sensor or instrument to be placed inside the flexible tank. The sensor data provided by the load-sensitive sensors are used to compute the weight of the substance contained in the flexible tank, and the volume of the substance can be determined based on the computed weight and the density of the substance. The results can be displayed locally or be transmitted to a remote location to facilitate the monitoring and management of the stored substance.

According to various embodiments, different arrangements or configurations of the load-sensitive sensors can be used. For example, the load-sensitive sensors can be arranged in a predefined pattern (e.g., in various linear arrangements) or in a pseudo random pattern. In some embodiments, the load sensitive sensors can be arranged proximate to the corners and/or edges of the footprint of the flexible tank (e.g., if the load sensitive sensors are being added to an existing tank installation where access to underneath the center of the flexible tank may be difficult). In some embodiments, the load-sensitive sensors can be arranged to cover the full length or width of the maximum footprint area of the flexible tank (e.g., footprint when the flexible tank is empty), and can be arranged to be substantially along or parallel to one or more axes of symmetry of the flexible tank.

In various embodiments, at least a first set of load-sensitive sensors are arranged in a variable region of the footprint of the flexible tank (e.g., the region between the footprint of the flexible tank when empty and the footprint of the flexible tank when full), and at least a second set of load-sensitive sensors are arranged in a static region of the footprint of the flexible tank, where the load-sensitive sensors are covered at all times by the flexible tank in operation regardless of whether the flexible tank is empty or full. In various embodiments, at least one pair of adjacent load-sensitive sensors in the first set of load-sensitive sensors has a spacing between them that is less than the spacing between a pair of adjacent load-sensitive sensors in the second set of load-sensitive sensors. In some embodiments, the spacing between all adjacent load-sensitive sensors in the first set of load-sensitive sensors is less than the spacing between any pair of adjacent load-sensitive sensors in the second set of load-sensitive sensors.

The number of load-sensitive sensors used for a particular flexible tank can depend on the size of the flexible tank and/or the error budget for the system. For example, a 210,000 gallon flexible tank may use more load-sensitive sensors than a 5,000 gallon flexible tank. As another example, some arrangements of load-sensitive sensors can determine the volume of the substance in the flexible tank down to a 1% error. For a system that can tolerate a higher percentage inaccuracy or error (i.e. higher error budget), fewer load-sensitive sensors can be used in such a system than the 1% error arrangement, for example, to reduce costs.

In some embodiments, the load-sensitive sensors can be set in position under the flexible tank individually in an independent manner. In some embodiments, the load-sensitive sensors can be provided as part of a flexible matrix that conforms to the bottom surface of the flexible tank, or be provided as part of a rigid matrix to which the bottom surface of the flexible tank conforms. For example, the load-sensitive sensors can be individually arranged to conform to the external bottom surface of the flexible tank, or be individually arranged on the ground or on a support structure (e.g., a platform) on which the flexible tanks sits. In some embodiments, the load-sensitive sensors can be arranged on a strip, liner, or mat, and the load-sensitive sensors are collectively set in position by placing the strip, liner, or mat under the flexible tank.

According to various embodiments, at least some or all of the load-sensitive sensors used are discrete independent sensors, in the sense that the load-sensitive sensors are not in fluid contact with each other, and each load-sensitive sensor collects its own measurement independently from the other load-sensitive sensors. In other words, the measurement of one load-sensitive sensor does not affect the measurement of another load-sensitive sensor. The use of discrete sensors provides better reliability, because a failure in one load-sensitive sensor does not jeopardize the measurements of the other load-sensitive sensors, and the system can still operate by relying on measurements from the other functioning load-sensitive sensors.

FIG. 1 illustrates various views of a flexible tank 101 according to some embodiments. Flexible tank 101 can be used as a standalone tank, or be part of a larger tank farm installation that includes multiple tanks at one location. Flexible tank 101 may come in various sizes and capacities (e.g., from 3,000 gallons to 250,000 gallons, although smaller or larger tanks can also be used). As an example, a 210,000 gallon flexible tank may measure about 5184 square feet. As another example, a 10,000 gallon flexible tank may measure about 484 square feet. In some embodiments, flexible tank 101 can made of a load-bearing synthetic fiber or a high-tensile strength polyester fabric, and may include elastomer or plastomer coatings to protect the material of flexible tank 101 from the substance being stored therein. As compared to rigid tanks, a flexible tank can be much lighter when empty, and can be rolled or folded up, making a flexible tank easier to transport and set up.

According to some embodiments, planar view 101A of flexible tank 101 may have a rectangular shape as shown in FIG. 1. Although flexible tank 101 is shown to have a rectangular shape, it should be understood that in other embodiments, the flexible tank may take on a different shape, and that shape can be symmetrical or asymmetrical. For example, in other embodiments, the planar view of the flexible tank may have a circular or elliptical shape, or may take the form of some other polygon or irregular shape.

In some embodiments, planar view 101A of flexible tank 101 may have a footprint 102 when flexible tank 101 is full, and a footprint 104 when flexible tank 101 is empty. When flexible tank 101 is empty, the body of flexible tank 101 is in a collapsed state and is flattened out as shown in side view 101C. As a result, the surface area being occupied by the bottom of flexible tank 101 is largest when flexible tank 101 is empty. When flexible tank 101 is filled with a substance 150 (e.g., fuel or water, etc.), the body of flexible tank 101 inflates and rises, and the sides of flexible tank 101 rolls up off the resting surface as shown in side view 101B. As a result, the surface area being occupied by the bottom of flexible tank 101 reduces as the volume of substance 150 in flexible tank 101 increases. Thus, the actual footprint of flexible tank 101 at any point in time (will be referred to as the "dynamic footprint") may be somewhere between and including footprint 102 and footprint 104. As flexible tank 101 is being filled up, the dynamic footprint of flexible tank 101 retracts, and as substance 150 is dispensed from flexible tank 101, the dynamic footprint of flexible tank 101 expands. Thus, the region of footprint 102 can be referred to as the static region or static portion of the footprint of flexible tank 101, and the region between footprints 102 and 104 can be referred to as the variable region or variable portion of the footprint of flexible tank 101. The dynamic footprint of flexible tank 101 may be the largest or at its maximum when flexible tank 101 is empty and corresponding to footprint 104, and the dynamic footprint of flexible tank 101 may be the smallest or at its minimum when flexible tank 101 is full and corresponding to footprint 102.

In some embodiments, the dynamic footprint of the flexible tank may expand and retract symmetrically as shown, for example, if the shape of the flexible tank is symmetric, and the flexible tank is resting on a flat surface. In other embodiments, the dynamic footprint of the flexible tank may expand and retract asymmetrically. This may happen, for example, if the flexible tank is asymmetrically shaped, or if the flexible tank is resting on an uneven or tilted surface or terrain. The techniques described herein can be used to determine the weight and volume of a substance regardless of whether the flexible tank is symmetrically shaped, and regardless of whether the dynamic footprint of the flexible tank expands and retracts symmetrically.

Figure 2:
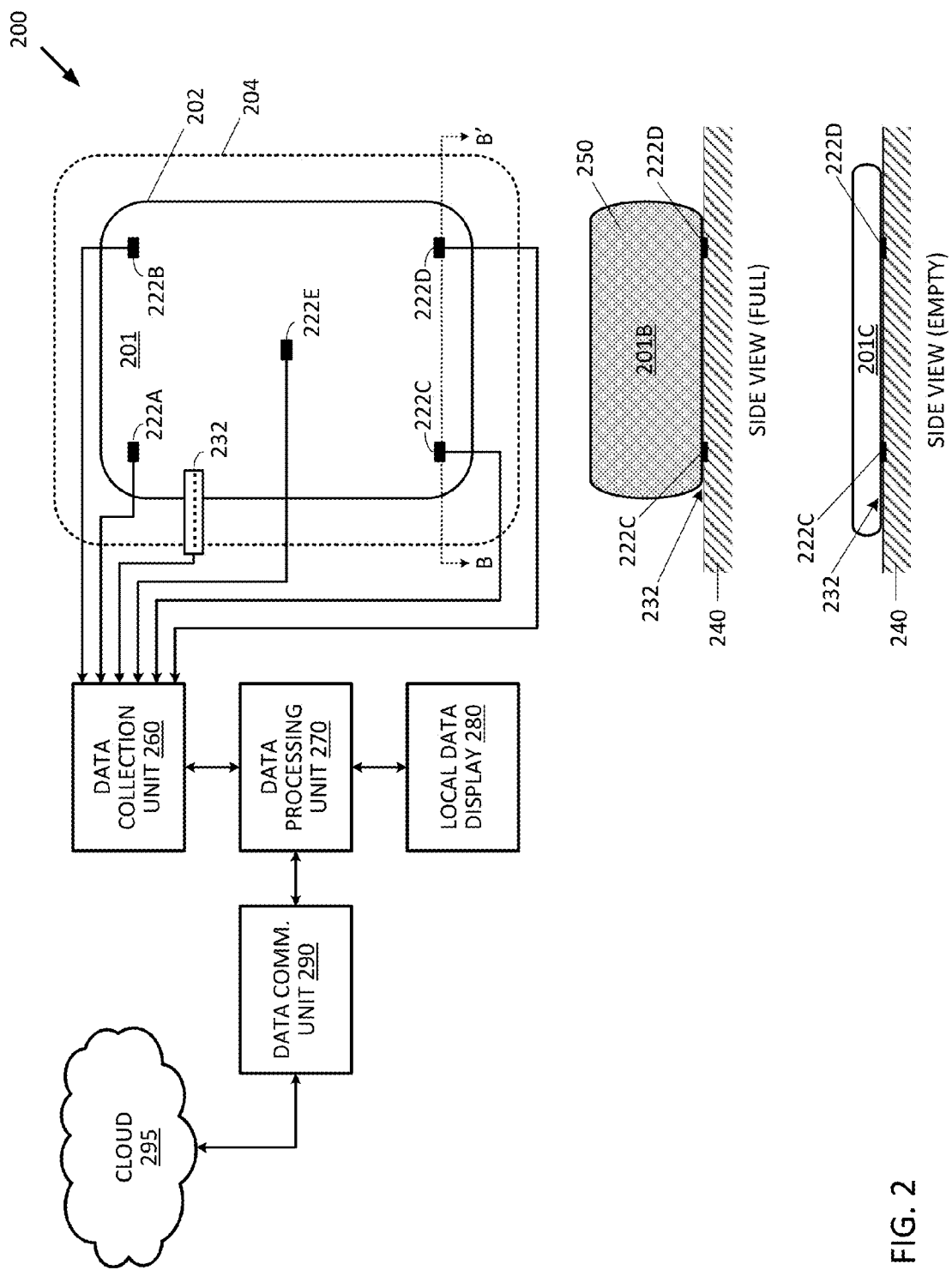
FIG. 2 illustrates an exemplary system for determining the weight and volume of a substance contained in a flexible tank, according to some embodiments.

FIG. 2 illustrates an exemplary arrangement of load-sensitive sensors under a flexible tank 201 that can be used by system 200 to determine the volume of a substance contained in flexible tank 201, according to some embodiments. Flexible tank 201 may have a first footprint 204 shown in the dotted line when flexible tank 201 is empty, and may retract to a second footprint 202 when flexible tank 201 is full. In the illustrated embodiment, system 200 includes a load-sensing apparatus that is made up of a first set of load-sensitive sensors 232, and a second set of load-sensitive sensors 222A-E. System 200 also includes a data collection unit 260, a data processing unit 270, a local data display 280, a data communication unit 290, and a remote computing cloud 295.

The first set of load-sensitive sensors 232 includes multiple load-sensitive sensors arranged in at least a region of footprint 204 that is external to footprint 202. The role of load-sensitive sensors 232 is to provide a measurement of the dynamic footprint of flexible tank 201, i.e. the surface area being occupied by the bottom of flexible tank 201. In some embodiments, load-sensitive sensors 232 are arranged linearly on a line that intersects with an edge of flexible tank 201. In some embodiments, the arrangement of load-sensitive sensors 232 is long enough to sense the entire change in the dynamic footprint of flexible tank 201. For example, the arrangement of load-sensitive sensors 232 can span a line perpendicular to an edge of footprint 202 and extending from that edge to the corresponding edge of footprint 204. In some embodiments, the arrangement of load-sensitive sensors 232 can also extend into footprint 202 and/or extend beyond footprint 204. As another example, load-sensitive sensors 232 can be arranged on a diagonal line that extends from a corner of footprint 202 to the corresponding corner of footprint 204. The number of load-sensitive sensors 232 used and the spacing between each adjacent load-sensitive sensors 232 may depend on the desired accuracy of the system. A greater number of load-sensitive sensors 232 and/or a closer spacing between each adjacent load-sensitive sensors 232 can provide a more accurate measurement of the dynamic footprint of flexible tank 201.

Each of load-sensitive sensors 232 can be used to detect whether the load-sensitive sensor is exposed or is being covered by flexible tank 201. As the dynamic footprint of flexible tank 201 changes in response to flexible tank 201 being filled or emptied, the number of load sensitive sensors 232 that are covered by flexible tank 201 also changes accordingly. Thus, the sensor data provided by load-sensitive sensors 232 indicating which of the load-sensitive sensors 232 is being covered by flexible tanks 201 can be used to determine the dynamic footprint of flexible tank 201.

Because the role of load-sensitive sensors 232 is to detect the presence of flexible tank 201 over each load-sensitive sensor as the dynamic footprint of flexible tank 201 changes, in some embodiments, load-sensitive sensors 232 can be implemented as presence sensors that provide presence measurements indicating whether there is an object in contact with and/or placed over the sensor. The sensor data provided by a presence sensor can be represented as a binary output of either an ON or OFF state. An ON state can indicate that the load-sensitive sensor is currently being covered by flexible tank 201, and an OFF state can indicate that the load-sensitive sensor is exposed and not being covered by flexible tank 201. Alternatively, pressure sensors that provide a pressure measurement can also be used. A non-zero pressure measurement can indicate that the load-sensitive sensor is currently being covered by flexible tank 201, and a zero pressure measurement can indicate that the load-sensitive sensor is exposed and not being covered by flexible tank 201.

In some embodiments, only one of the edges of the footprint of flexible tank 201 is provided with an arrangement of load-sensitive sensors 232, and the other edges may not have an arrangement of load-sensitive sensors 232. The dynamic footprint of flexible tank 201 can be determined by relying on the symmetry of flexible tank 201 and extrapolating the sensor data of load-sensitive sensors 232 for the one edge to the other edges. In embodiments in which flexible tank 201 may be asymmetrically shaped, or if flexible tank 201 otherwise retracts and expands asymmetrically (e.g., if flexible tank 201 is resting on an uneven or tilted surface or terrain), additional load-sensitive sensors 232 can be arranged at one or more of the other edges of the footprint of flexible tank 201.

The load-sensing apparatus of system 200 also includes a second set of load-sensitive sensors 222A-E arranged within footprint 202. Thus, the second set of load-sensitive sensors 222A-E are covered by flexible tank 201 regardless of whether flexible tank 201 is full or empty (or partially filled). As explained further below, load-sensitive sensor 222E can be optional in some embodiments. The role of load-sensitive sensors 222A-E is to provide a pressure level profile of flexible tank 201 (i.e. the amount of pressure being exerted by the weight of the substance and flexible tank 201 at various locations under the flexible tank 201). Thus, the sensor data provided by each of the load-sensitive sensors 222A-E can be a pressure measurement indicating the amount of pressure that the particular load-sensitive sensor is experiencing at its particular location.

In some embodiments, at least one load-sensitive sensor is arranged within footprint 202 proximate to each corner of footprint 202. In the embodiment shown in FIG. 2, the four corners of footprint 202 each has a respective load-sensitive sensor 222A-D arranged proximate to the corner. Each corner load-sensitive sensor 222A-D can be located within a certain distance from the corresponding corner of footprint 202. For example, each corner load-sensitive sensor 222A-D can be located within a distance of 5%, 10%, 15%, 20%, or 25% of the diagonal length of footprint 202 from the corresponding corner. In other embodiments, other distances can be used.

The arrangement of placing load-sensitive sensors proximate to the corners of footprint 202 may be suitable for retrofitting an existing flexible tank installation in which the surface under the flexible tank cannot easily be accessed (e.g., because the flexible tank is in use, or otherwise cannot easily be moved). Such an arrangement does not require the complete removal of the flexible tank for the purpose of installing the load-sensitive sensors 222A-D. In such scenarios, each corner of the flexible tank 201 can be lifted up to the extent possible, and one or more load-sensitive sensors can be arranged under flexible tank 201 proximate to the corner to retrofit the existing tank installation for use with the techniques disclosed herein.

In some embodiments, in addition to or alternative to the corner load-sensitive sensors 222A-D, at least one load-sensitive sensor can be arranged within footprint 202 proximate to each edge of footprint 202. For example, an edge load-sensitive sensor can be arranged at the midpoint or other distance along an edge and be located within a distance of 5%, 10%, 15%, 20%, or 25% of the traverse length of footprint 202 from that edge. In other embodiments, other distances can be used, and more than one edge load-sensitive sensors can be arranged proximate to each edge. In a similar manner as the corner load-sensitive sensors, each edge of flexible tank 201 can be lifted up to the extent possible, and one or more edge load-sensitive sensor can be arranged under flexible tank 201 proximate to the corresponding edge to retrofit an existing tank installation for use with the techniques disclosed herein.

The second set of load-sensitive sensors can also include an optional load-sensitive sensor 222E arranged proximate to or at the geometric center of footprint 202, if placement of such a sensor is possible. Load-sensitive sensor 222E proximate to the geometric center of footprint 202 can improve the accuracy of the pressure level profile of flexible tank 201 by providing an additional pressure measurement near or at the center of flexible tank 201. It should be understood that in some embodiments, the second set of load-sensitive sensors arranged within footprint 202 can include additional load-sensitive sensors not specifically shown. For example, instead of representing just one load-sensitive sensor, each of the reference designators 222A-E may represent a cluster of load-sensitive sensors that are distributed across a region proximate to the corresponding location in footprint 202. Furthermore, one or more additional load-sensitive sensors can be arranged elsewhere at other locations within footprint 202 to provide a more accurate profile of the pressure distribution under flexible tank 201.

FIG. 2 also illustrates a side view 201B of flexible tank 201 resting on a support surface 240 (e.g., on the ground or on a support structure, etc.) when flexible tank 201 is full and filled with a substance 250, and a side view 201C of flexible tank 201 resting on support surface 240 when flexible tank 201 is empty. The side views are taken along the line B-B' of flexible tank 201. As shown, load-sensitive sensors 222C and 222D are covered by flexible tank 201 at all times regardless of whether flexible tank 201 is full or empty (or partially filled). On the other hand, at least some of load-sensitive sensors 232 are exposed when flexible tank 201 is full, but are covered by flexible tank 201 when flexible tank 201 is empty.

The first set of load-sensitive sensors 232 and the second set of load-sensitive sensors 222A-E are communicatively coupled to a data collection unit 260. The communication channel between load-sensitive sensors 232 and 222A-E and data collection unit 260 can be implemented using a wired connection and/or a wireless connection. For example, a wired-connection can be implemented using a fiber-optic connection or other electrical connection. A wireless connection can be implemented using any portion of the electromagnetic spectrum such as any suitable radio frequency, infrared frequency, etc. Data collection unit 260 collects and stores the sensor data (i.e. presence measurements and/or pressure measurements) provided by load-sensitive sensors 232 and 222A-E. For example, each of load-sensitive sensors 232 and 222A-E may transmit a signal to data collection unit 260 representing a pressure measurement in the form of a numeric value indicating the amount of pressure measured by the corresponding load-sensitive sensor. In some embodiments, instead of providing pressure measurements, load-sensitive sensors 232 may transmit a signal representing a presence measurement (i.e. an ON or OFF state of the corresponding load-sensitive sensor).

In some embodiments, load-sensitive sensors 232 and 222A-E may transmit their respective sensor data continuously to data collection unit 260. In other embodiments, load-sensitive sensors 232 and 222A-E may transmit their respective sensor data periodically at a predetermined time interval, or in response to a triggering event (e.g., each time flexible tank 201 is refilled, each time the stored substance is dispensed from flexible tank 201, and/or each time a change or a threshold amount of change in a sensor measurement is detected, etc.). Data collection unit 260 stores the sensor data received from load-sensitive sensors 232 and 222A-E (e.g., in storage memory and/or fixed disks or drives, etc.), and provides the sensor data to data processing unit 270.

Data processing unit 270 processes the sensor data stored by data collection unit 260, and creates a pressure level profile for flexible tank 201. The pressure level profile can be created using at least the pressure measurements from the second set of load-sensitive sensors 222A-E, and indicates the distribution of pressure exerted by the weight of the substance and flexible tank 201 across the footprint of flexible tank 201. In some embodiments, the pressure level profile can also include pressure measurements from the first set of load-sensitive sensors 232 if load-sensitive sensors 232 are implemented as pressure sensors. In some embodiments, data processing unit 270 also determines the dynamic footprint of flexible tank 201 (i.e. the surface area being occupied by the bottom of flexible tank 210). The dynamic footprint of flexible tank 201 can be determined using the sensor data (e.g., presence measurements or pressure measurements) from the first set of load-sensitive sensors 232. Using the pressure level profile and/or the dynamic footprint of flexible tank 201, data processing unit 270 can calculate the weight of the substance contained in flexible tank 201.

For example, in some embodiments, the weight of the substance contained in flexible tank 201 can be calculated by multiplying the average pressure by the dynamic footprint surface area, and subtracting the weight of an empty flexible tank 201 from the result to account for the native weight of flexible tank 201. The average pressure can be calculated from the pressure level profile. In some embodiments, the average pressure can be an arithmetic mean of the pressure measurements. In other words, the average pressure can be the summation of all of the pressure measurements divided by the number of pressure measurements provided (i.e. number of pressure sensors). In some embodiments, the average pressure can be an arithmetic mean of pressure estimates that are based on a mathematical function of the pressure measurements, in which the mathematical function accounts for the shape of the surface upon which the bottom of the flexible tank rests. In other embodiments, the average pressure can be a weighted average where each pressure measurement is scaled by a percentage based on the location of the pressure sensor and relative surface area coverage of that location. The scaled pressure measurements are summed to derive the average pressure.

For example, the pressure measurement from central load-sensitive sensor 222E can be scaled by 0.4 indicating that the central load-sensitive sensor 222E has a surface area coverage of 40%, and each of the pressure measurements from corner load-sensitive sensors 222A-D can be scaled by 0.15 indicating that each of the corner load-sensitive sensors 222A-D has a surface area coverage of 15%. The scaled pressure measurements are summed together to derive the average pressure. The scaling factor used for each pressure measurement can be based on the location of the particular pressure sensor and relative surface area coverage of the particular pressure sensor at that location. The scaling factors should add up to 1.00 or 100%. In some embodiments, the average pressure can be calculated using a combination of the above techniques. For example, in embodiments in which there are a cluster of load-sensitive sensors at each corner and a cluster of central load-sensitive sensors, the pressure measurements in each cluster can be averaged, and the averaged cluster pressure measurement can be scaled and summed together to derive the average pressure.

In some embodiments, the dynamic footprint surface area of flexible tank 201 can be determined using the presence measurements from the first set of load-sensitive sensors 232. Each load sensitive-sensor 232 that detects the presence of flexible tank 201 over that sensor represents an incremental surface area expansion from footprint 202. Thus, the dynamic footprint surface area can be calculated by adding the corresponding incremental surface area of each load-sensitive sensor 232 that detects the presence of flexible tank 201 to the surface area of footprint 202.

The average pressure can then be multiplied by the dynamic footprint surface area to determine the combined weight of the substance and flexible tank 201. The native weight of flexible tank 201 (i.e. the weight of an empty flexible tank 201) can be subtracted from the combined weight to determine the weight of just the substance contained in flexible tank 201. From the weight of the substance, the volume of the substance contained in flexible tank 201 can be calculated using the known density of the substance at the temperature of the substance. The volume of the substance contained in flexible tank 201 is calculated by dividing the weight of the substance by the density. In some embodiments, statistical analysis can be used to assign a confidence level to the volume and weight results.

The calculation results of data processing unit 270 can be displayed locally to a user by a local data display 280 for monitoring and control purposes. In some embodiments, the results can also be transmitted by a data communication unit 290 coupled to data processing unit 270 to one or more remote locations via a network for remote management of flexible tanks in a tank farm, or across several tank farms that are geographically distributed around the world. For example, data communication unit 290 can transmit the results to a remote computing cloud 295 to facilitate the remote monitoring of the flexible tanks (e.g., by a central command center). Remote computing cloud 295 can be implemented with one or more remote servers and/or storage devices, and the remotes servers and/or storage devices can be located in one or more geographical locations and communicatively coupled with each other to form remote computing cloud 295.

Figure 3:
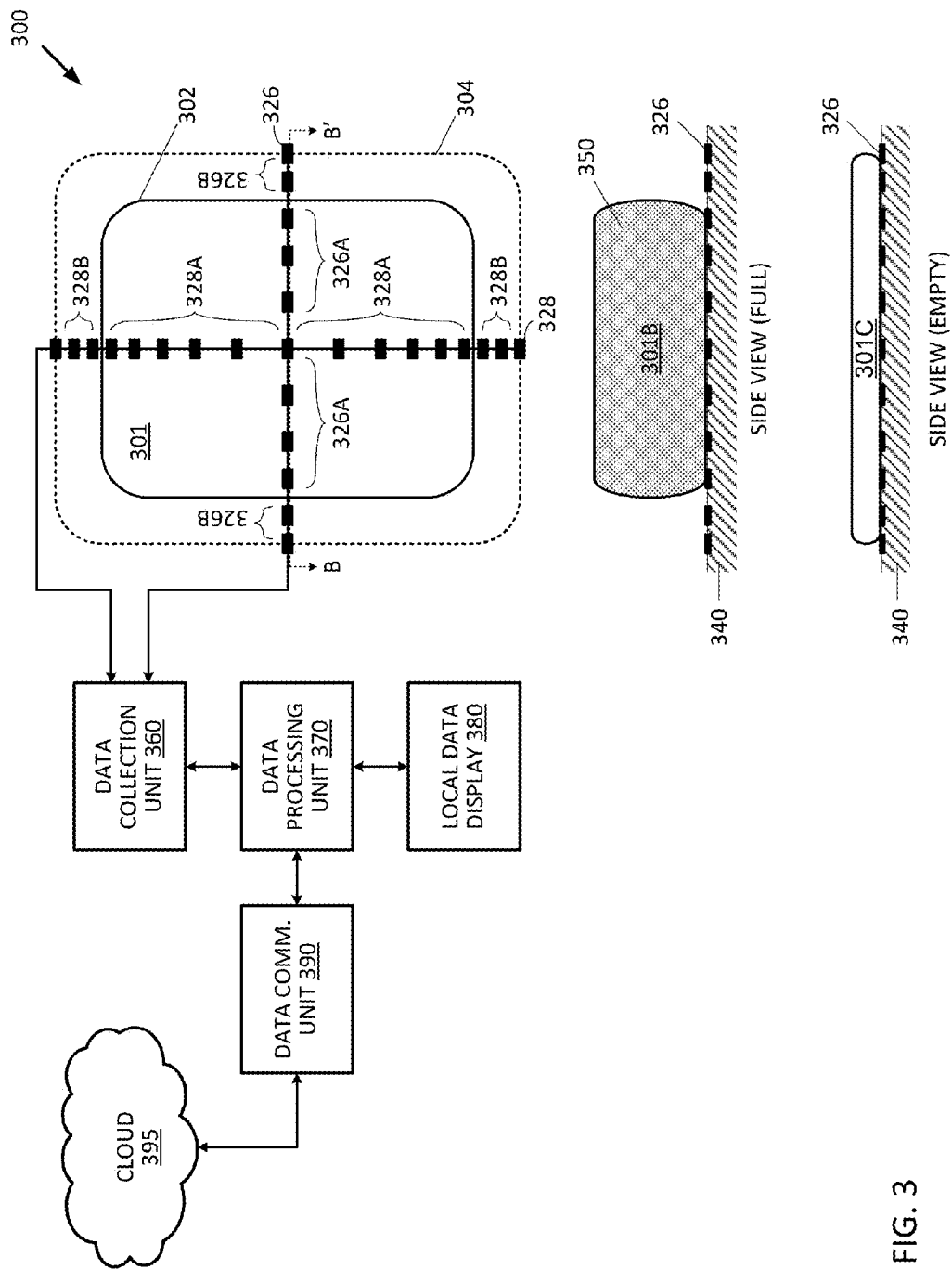
FIG. 3 illustrates another exemplary system for determining the weight and volume of a substance contained in a flexible tank, according to some embodiments.
Figure 4:
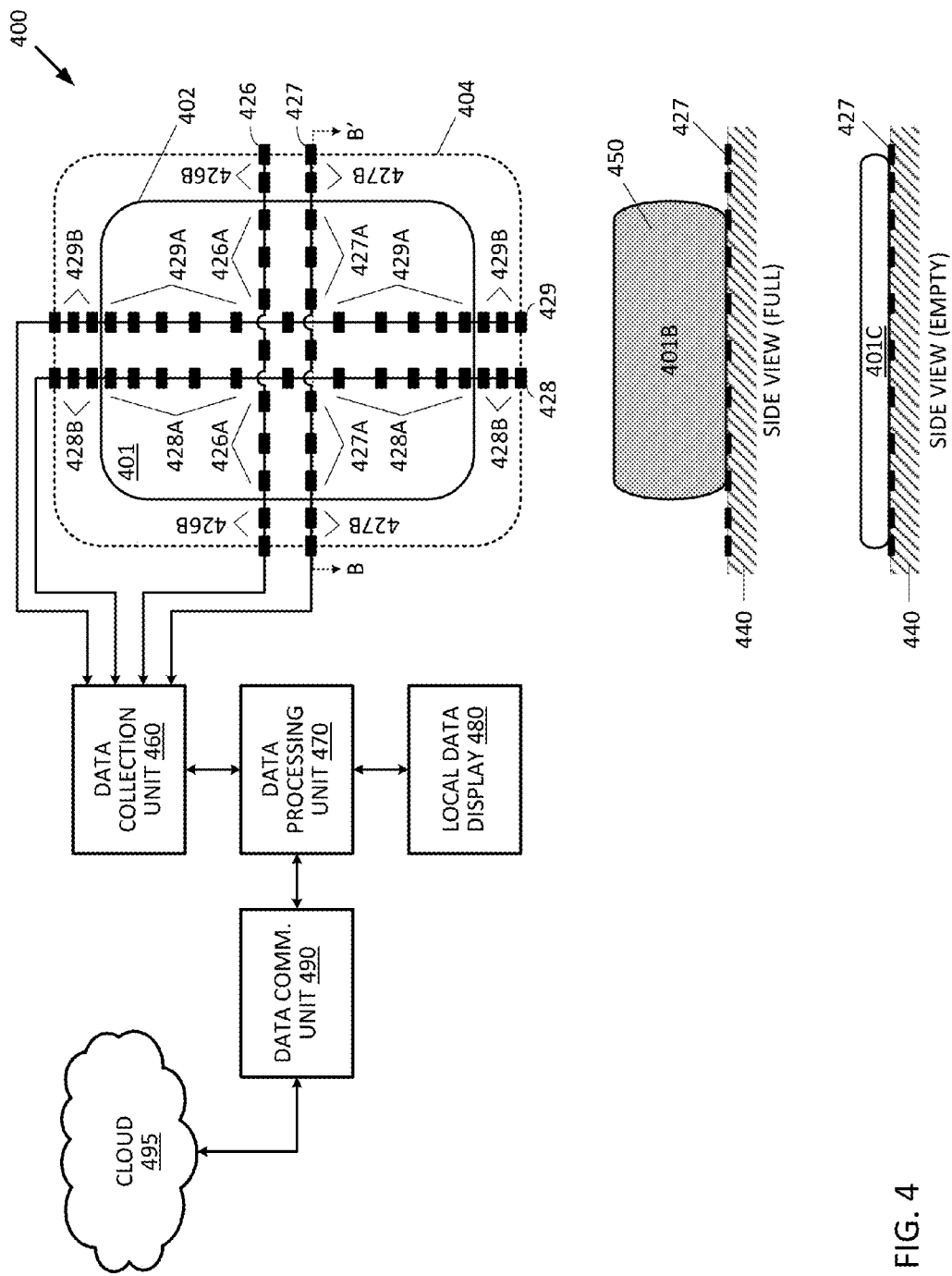
FIG. 4 illustrates a further exemplary system for determining the weight and volume of a substance contained in a flexible tank, according to some embodiments.
Figure 5:
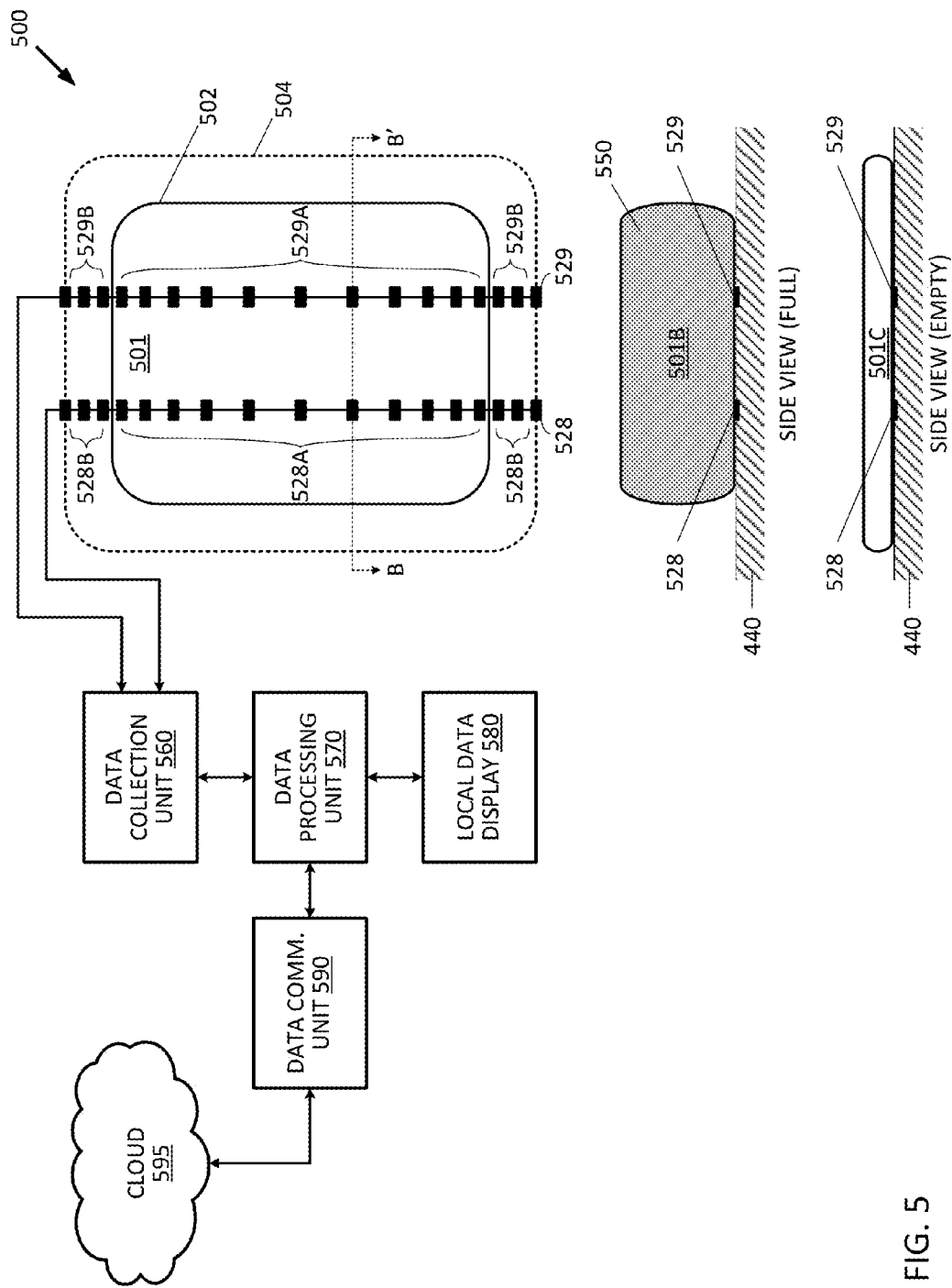
FIG. 5 illustrates a yet further exemplary system for determining the weight and volume of a substance contained in a flexible tank, according to some embodiments.

FIGS. 3-5 illustrate various arrangements of load-sensitive sensors that can be used to determine the volume of a substance contained in a flexible tank, according to some embodiments. The load sensitive sensors according to these and other embodiments can be placed on a support surface prior to the placement of the flexible tank over that surface. Such embodiments may be suitable for flexible tank installations that are still under construction where the surface under the flexible tank can easily be accessed. In FIGS. 3-5, reference designators having a similar numbering as those of FIG. 2 may refer to components similar to those described above with reference to FIG. 2, and hence a detailed description of which need not be repeated below.

FIG. 3 illustrates another exemplary arrangement of load-sensitive sensors under a flexible tank 301 that can be used by system 300 to determine the volume of a substance in flexible tank 301, according to some embodiments. The load-sensing apparatus of system 300 includes a linear arrangement of lateral load-sensitive sensors 326 located substantially along the lateral axis of symmetry of the footprint of flexible tank 301, and a linear arrangement of longitude load-sensitive sensors 328 located substantially along the longitudinal axis of symmetry of the footprint of flexible tank 301. Thus, system 300 may have linear arrangements of load-sensitive sensors that are perpendicular to each other. Each linear arrangements of load-sensitive sensors can be arranged either aligned at the respective axis of symmetry or within the distance of 1%, 5%, 10%, or 15% of the traverse length of footprint 302 from the respective axis of symmetry.

The linear arrangement of lateral load-sensitive sensors 326 extends to at least the entire length of footprint 304 in the lateral axial direction. Thus, the linear arrangement of lateral load-sensitive sensors 326 includes both load-sensitive sensors 326A arranged within footprint 302, as well as load-sensitive sensors 326B arranged in a region of footprint 304 that is external to footprint 302. In some embodiments, the spacing between a pair of adjacent lateral load-sensitive sensors 326B external to footprint 302 is less than the spacing between a pair of adjacent lateral load-sensitive sensors 326A that are within footprint 302. In some embodiments, the spacing of adjacent lateral load-sensitive sensors 326 can decrease in a graduated manner as the distance from the center of footprint 302 increases. In other words, adjacent lateral load-sensitive sensors 326 are arranged closer and closer together as they get further and further away from the center of footprint 302. Adjacent load-sensitive sensors 326 near the center can be spaced farther apart because the changes in pressure measurements near the center of footprint 302 is not expected to be high. In contrast, the pressure measurements near the edge is expected to change more dramatically. Thus, adjacent load-sensitive sensors 326 near the edge can be spaced closer together to provide a more accurate picture of the pressure distribution.

Similarly, the linear arrangement of longitude load-sensitive sensors 328 extends to at least the entire length of footprint 304 in the longitudinal axial direction. Thus, the linear arrangement of longitude load-sensitive sensors 328 includes both load-sensitive sensors 328A arranged within footprint 302, as well as load-sensitive sensors 328B arranged in a region of footprint 304 that is external to footprint 302. In some embodiments, the spacing between a pair of adjacent longitude load-sensitive sensors 328B external to footprint 302 is less than the spacing between a pair of adjacent longitude load-sensitive sensors 328A that are within footprint 302. In some embodiments, the spacing of adjacent longitude load-sensitive sensors 328 can decrease in a graduated manner as the distance from the center of footprint 302 increases. In other words, adjacent longitude load-sensitive sensors 328 are arranged closer and closer together as they get further and further away from the center of footprint 302.

In some embodiments, in addition to or alternative to load-sensitive sensors 326 and 328, linear arrangements of load-sensitive sensors can be arranged substantially along the diagonal axes of symmetry. It should be understood that depending on the shape of the footprint of the flexible tank, a linear arrangement of load-sensitive sensors can be arranged on any axis of symmetry.

According to some embodiments, each of the lateral load-sensitive sensors 326 and each of the longitude load-sensitive sensors 328 can be implemented as a pressure sensor that provides a pressure measurement. The sensor data (i.e. pressure measurement) from each of the lateral load-sensitive sensors 326 and each of the longitude load-sensitive sensors 328 are stored by data collection unit 360, and provided to data processing unit 370. Data processing unit 370 creates a pressure level profile of flexible tank 301 from the collected sensor data, and calculates the weight of the substance contained in flexible tank 301.

The combined weight of the substance and flexible tank 301 can be calculated by integrating the pressure level profile over the incremental surface area coverage of each load-sensitive sensor. The incremental surface area coverage of each load-sensitive sensor is based on the spacing of the load-sensitive sensor to its adjacent neighbors. In some embodiments, the dynamic footprint of flexible tank 301 need not be determined separately, because information about the dynamic footprint of flexible tank 301 is intrinsically included in the pressure level profile of flexible tank 301. For example, the transition point along lateral load-sensitive sensors 326B and longitude load-sensitive sensors 328B where the pressure measurement starts becoming zero marks the location of the edge of the dynamic footprint of flexible tank 301. Integrating over the zero pressure measurements does not affect the overall result, and thus the dynamic footprint of flexible tank 301 need not be determined separately. The weight of an empty flexible tank 301 can then be subtracted from the integral result to obtain the weight of the substance contained in flexible tank 301.

In some embodiments, the calculation techniques described with reference to FIG. 2 can be used. For example, the dynamic footprint of flexible tank 301 can be determined based on the sensor data from lateral load-sensitive sensors 326B and longitude load-sensitive sensors 328B, and the dynamic footprint surface area can be multiplied with an average pressure to determine the weight of the substance contained in flexible tank 301. In such embodiments, lateral load-sensitive sensors 326B and longitude load-sensitive sensors 328B can be implemented as presence sensors or pressure sensors.

Once the weight of the substance contained in flexible tank 301 is determined, the volume of the substance can be calculated using the density of the substance according to the techniques described above.

FIG. 4 illustrates a further exemplary arrangement of load-sensitive sensors under a flexible tank 401 that can be used by system 400 to determine the volume of a substance in flexible tank 401, according to some embodiments. The load-sensing apparatus of system 400 includes a pair of linear arrangement of lateral load-sensitive sensors 426 and 427 arranged substantially parallel to the lateral axis of symmetry of the footprint of flexible tank 401, and a pair of linear arrangements of longitude load-sensitive sensors 428 and 429 arranged substantially parallel to the longitudinal axis of symmetry of the footprint of flexible tank 401. The distance between the linear arrangement of load-sensitive sensors in each pair can be less than 10%, 20%, 30%, 40% or 50% of the traverse length of footprint 402. In other embodiments, other distances can be used. Each pair of linear arrangement of load-sensitive sensors can be arranged such that the respective axis of symmetry is located substantially midway between the pair of linear arrangement of load-sensitive sensors, although perfect alignment is not necessary. For example, in some embodiments, the respective axis of symmetry can be centered between the pair of linear arrangement of load-sensitive sensors, or be within 5%, 10%, 15%, 20%, 25%, or 30% of the distance separating the pair of linear arrangement from the midpoint of the pair.

The pair of linear arrangement of lateral load-sensitive sensors 426 and 427 extends to at least the entire length of footprint 404 in the lateral axial direction. Thus, the pair of linear arrangement of lateral load-sensitive sensors 426 and 427 includes load-sensitive sensors 426A and 427A arranged within footprint 402, as well as load-sensitive sensors 426B and 427B arranged in a region of footprint 404 that is external to footprint 402. The pair of linear arrangement of longitude load-sensitive sensors 428 and 429 extends to at least the entire length of footprint 404 in the longitudinal axial direction. Thus, the pair of linear arrangement of longitude load-sensitive sensors 428 and 429 includes load-sensitive sensors 428A and 429A arranged within footprint 402, as well as load-sensitive sensors 428B and 429B arranged in a region of footprint 404 that is external to footprint 402. In some embodiments, the spacing between adjacent load-sensitive sensors of a linear arrangement in a region of footprint 404 that is external to footprint 402 is less than the spacing between adjacent load-sensitive sensors of the linear arrangement within footprint 402. In some embodiments, the spacing of adjacent load-sensitive sensors of a linear arrangement can decrease in a graduated manner as the distance from the center of footprint 402 increases. In other words, adjacent load-sensitive sensors of a linear arrangement can be spaced closer and closer together as they get further and further away from the center of footprint 402.

In some embodiments, in addition to or alternative to the linear arrangements of load-sensitive sensors parallel to the lateral and longitudinal axes of symmetry, one or more linear arrangements of load sensitive sensors substantially parallel to the diagonal axes of symmetry can be used. It should be understood that depending on the shape of the footprint of the flexible tank, linear arrangements of load-sensitive sensors can be arranged substantially parallel to any axis of symmetry. Furthermore, for each axis of symmetry, there can be more than two parallel linear arrangements of load-sensitive sensors. Thus, in some embodiments, there can be a grid-like pattern of load-sensitive sensors.

The techniques and variations for determining the weight and volume of the substance contained in flexible tank 401 are similar to those discussed above with reference to FIG. 3. The use of parallel linear arrangements of load-sensitive sensors eliminates the need to precisely align flexible tank 401 over the arrangement of load sensitive sensors. For example, for a precisely aligned flexible tank, the pressure measurements of a corresponding pair of load-sensitive sensors from the two linear arrangements should be the same. However, when an axis of symmetry of flexible tank 401 is not precisely aligned with the center between the parallel linear arrangement of load-sensitive sensors for that axis (e.g., due to a lateral offset or a rotation angle), the misalignment may cause the pressure measurements of the corresponding pair of load-sensitive sensors to differ. Nevertheless, the misalignment will intrinsically be corrected by integrating over the two pressure measurements or averaging out the two pressure measurements. Thus, in embodiments in which parallel linear arrangements of load-sensitive sensors are used, placement of the flexible tank over the load-sensitive sensors can be performed more coarsely without adversely affecting the volume calculation.

FIG. 5 illustrates another exemplary arrangement of load-sensitive sensors under a flexible tank 501 that can be used by system 500 to determine the volume of a substance in flexible tank 501, according to some embodiments. The load-sensing apparatus of system 500 includes a pair of linear arrangement of load-sensitive sensors 528 and 529 arranged substantially parallel to one of the axis of symmetry of the footprint of flexible tank 501. The axis of symmetry can preferably be a longitudinal axis of symmetry as shown in FIG. 5, or can be a diagonal axis of symmetry, lateral axis of symmetry, or some other axis of symmetry of the footprint of flexible tank 501. The distance between the pair of linear arrangements of load-sensitive sensors 528 and 529 can be greater than separating distance in the embodiments of FIG. 4. For example, the distance between the pair of linear arrangements of load-sensitive sensors 528 and 529 can greater than 20%, 30%, 40%, 50%, 60%, or 70% of the traverse length of footprint 502. In other embodiments, other distances can be used. By separating the linear arrangements to be further apart, each of load-sensitive sensors 528 and 529 can provide a wider coverage (e.g., in the lateral direction), and thus the lateral linear arrangement of load sensitive sensors (e.g., lateral load sensitive sensors 426 and 427 of FIG. 4) can be eliminated without adversely affecting the volume calculation. The techniques and variations for system 500 are similar to those discussed above with reference to system 400 in FIG. 4, and thus a detailed description of which need not be repeated.

It should be understood that any of the arrangements described herein can be combined in any number of ways. For example, some embodiments may include both corner load sensitive sensors as well as load-sensitive sensors arranged substantially along an axis of symmetry.

It should also be understood that although the arrangements of load-sensitive sensors and volume determining techniques discussed above have been described with reference to a symmetric flexible tank, the arrangements and techniques can be applied to flexible tanks with other footprint geometries including asymmetrical flexible tanks or irregularly shaped flexible tanks. For example, a first set of load-sensitive sensors can be arranged under the flexible tank in a region that is between the full and empty footprints of the flexible tank. A second set of load-sensitive sensors can be arranged under the flexible tank in a region that is within the footprint of the flexible tank when the tank is full. The load-sensitive sensors can be arranged in a predefined pattern (e.g., linearly, proximate to corners/edges, parallel linear arrangements, etc.) or some pseudo random pattern, and the arrangements need not be related to any axis of symmetry. In some embodiments, the sensor data from the first set of load-sensitive sensors can be used to determine the dynamic footprint of the flexible tank, and the sensor data from the second set of load-sensitive sensors can be used to determine an average pressure. The average pressure and the dynamic footprint can be used to calculate the volume of the substance contained in the flexible tank. In some embodiments, a pressure level profile created from the sensor data from both sets of load-sensitive sensors can be used to derive the volume of the substance contained in the flexible tank.

According to various embodiments, depending on the role of the load-sensitive sensor, the load-sensitive sensor can be implemented as a presence sensor or a pressure sensor. A presence sensor can be implemented as a membrane switch, a contact switch, or other types of load or presence actuated switch, etc. A presence sensor is used to determine the dynamic footprint of the flexible tank by sensing the extent of contact between the bottom of the flexible tank and the surface supporting the flexible tank. In some embodiments, a mechanical buffer mechanism can be placed between each presence sensor and the flexible tank to ensure that the actuation force is sufficient to operate the presence sensor.

In various embodiments, a pressure sensor can be an optical strain gage that measures the force exerted by the weight of the flexible tank and the substance contained therein. The use of optical strain gages can provide high accuracy, long term stability and immunity to electromagnetic interference. An optical strain gage operates by being excited with a laser beam of a certain wavelength. The change in the laser beam wavelength observed at the output of the optical strain gage is proportional to the weight exerted over the optical strain gage. The output wavelength can be measured and converted to a pressure measurement signal. In some embodiments, a mechanical buffer mechanism can be placed between the pressure sensor and the flexible tank to match the range of the force exerted by the weight of the flexible tank and substance contained therein to the sensing range of the pressure sensor. Such a mechanism can also be used to adjust the pressure sensor collective to variations in the size of the flexible tank. In some embodiments, an individual pressure sensor can be implemented as a load cell, a resistive sensor, a capacitive sensor, a piezo-resistive sensor, a fluid-based sensor (e.g., a small fluid-filled container of which the internal pressure inside the container is proportional to the force being exerted on the container), or other types of strain gage or pressure detection sensor, etc.

Figure 6:
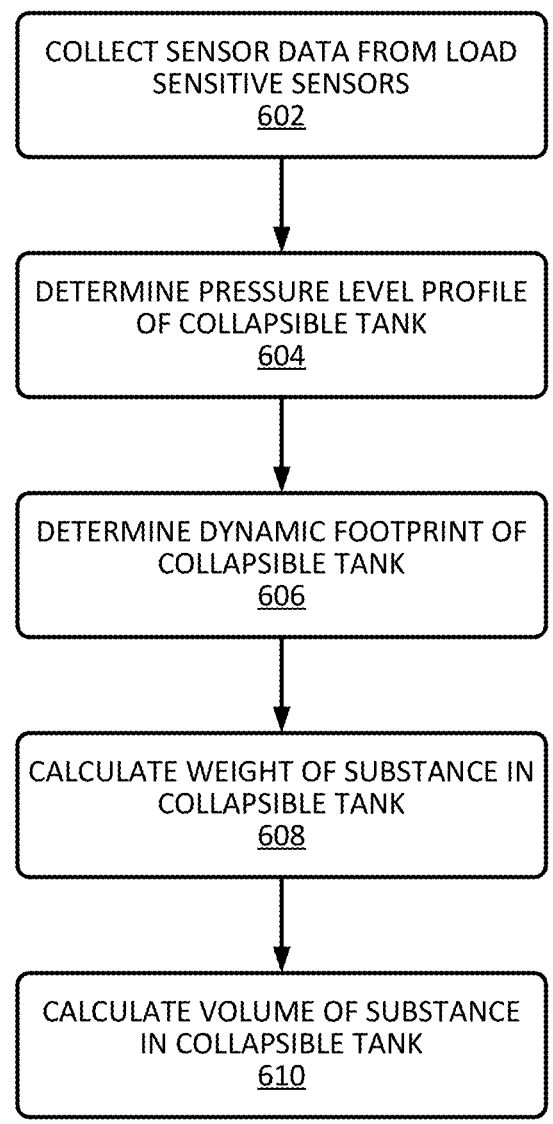
FIG. 6 illustrates an exemplary method for determining the weight and volume of a substance storage in a flexible tank, according to some embodiments.

FIG. 6 illustrates an exemplary flow diagram of a method for determining the volume of a substance contained in a collapsible tank, according to some embodiments. At block 602, sensor data are collected from load-sensitive sensors that are arranged for the most part under a collapsible tank. The load-sensitive sensors can include: (1) load-sensitive sensors placed below the collapsible tank in a variable portion of the footprint of the collapsible tank (e.g. region between the footprint of the collapsible tank when the collapsible tank is full and the footprint of the collapsible tank when the collapsible tank is empty); and (2) load-sensitive sensors placed in the static portion of the footprint under the collapsible tank where the load-sensitive sensors remain covered by the collapsible tank at all times during operation (e.g., within the footprint of the collapsible tank when the collapsible tank is full).

The load-sensitive sensors can be arranged in any of the configurations and variations describe herein. In some embodiments, the spacing between adjacent load-sensitive sensors placed in the variable portion of the footprint of the collapsible tank can be smaller than the spacing between adjacent load-sensitive sensors placed in the static portion of the footprint of the collapsible tank. In some embodiments, the sensor data collected from the load-sensitive sensors placed in the variable portion of the footprint of the collapsible tank can be in the form of presence measurements or pressure measurements, and the sensor data collected from the load-sensitive sensors placed in the static portion of the footprint of the collapsible tank can be in the form of pressure measurements.

At block 604, the pressure level profile of the collapsible tank is determined using at least some of the sensor data collected. For example, the pressure level profile can be determined using the pressure measurements from the load-sensitive sensors placed in the static portion of the footprint of the collapsible tank. In embodiments in which the sensor data from the load-sensitive sensors placed in the variable portion of the footprint of the collapsible tank are pressure measurements, the pressure measurements from these load-sensitive sensors can also be included in the pressure level profile.

At block 606, the dynamic footprint of the collapsible tank (i.e. surface area occupied by the bottom of the collapsible tank) is determined using the sensor data collected from the load-sensitive sensors placed in the variable portion of the footprint of the collapsible tank. In embodiments in which the sensor data from these load-sensitive data are pressure measurements, and these pressure measurements are included in the pressure level profile, the dynamic footprint need not be separately determined. This is because information about the dynamic footprint of the collapsible tank is intrinsically included in the pressure level profile.

At block 608, the weight of the substance contained in the collapsible tank is calculated. In some embodiments, an average pressure is determined from the pressure level profile (e.g., using an arithmetic mean calculation, a weighted average calculation, or a combination of both), and the average pressure is multiplied by the surface area of the dynamic footprint to obtain the combined weight of the substance and the collapsible tank. In some embodiments, the combined weight of the substance and the collapsible tank is obtained from integrating the pressure level profile over the incremental surface area coverage of each pressure sensor, where the incremental surface area coverage of each pressure sensor is dependent on the relative location and spacing of the pressure sensor. The native weight of the collapsible tank (i.e. weight of collapsible tank when it is empty) is then subtracted from the combined weight to derive the weight of the substance.

At block 610, the volume of the substance contained in the collapsible tank is calculated. The volume of the substance can be calculated by dividing the weight of the substance determined at block 608 by the density of the substance at the temperature of the substance. The volume of the substance can be displayed locally and/or be transmitted to a remote location for monitoring and management of the substance contained in collapsible tank.

According, the apparatuses and techniques described herein provide a way to safely and non-intrusively monitor the bulk storage of a substance contained in a flexible tank. The apparatuses and techniques can be used with existing bulk storage facilities or during the construction phase of a new bulk storage facility. In some embodiments, the apparatuses and techniques described herein do not require any alteration to the flexible tank itself, and can be installed on a support surface on which the flexible tank sits.

Figure 7:
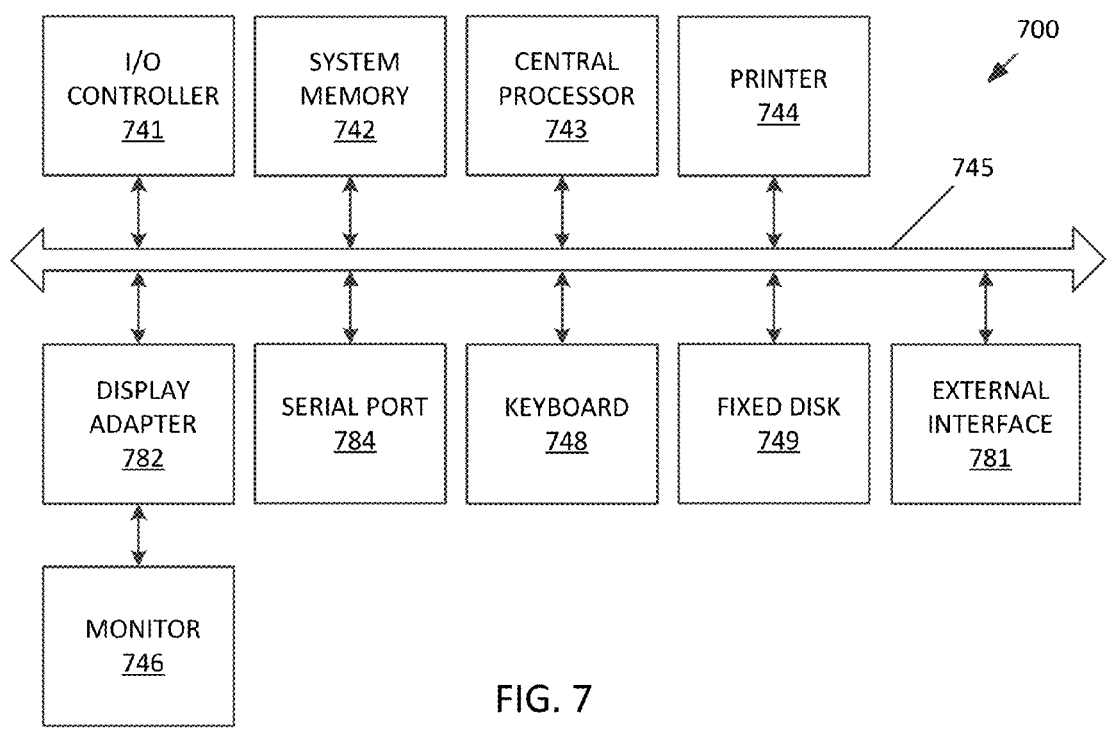
FIG. 7 illustrates an exemplary computing apparatus, according to some embodiments.

FIG. 7 illustrates a high level block diagram of a computer system that may be used to implement any of the components described herein (e.g., any one or more and/or combination of data collection unit, data processing unit, data communication unit, local data display, and/or computing cloud). The subsystems shown in FIG. 7 are interconnected via a system bus 745. Additional subsystems may include a printer 744, keyboard 748, fixed disk 749, and monitor 746, which is coupled to display adapter 782. Peripherals and input/output (I/O) devices, which couple to I/O controller 741, can be connected to the computer system by any number of means known in the art, such as a serial port. For example, serial port 784 or external interface 781 can be used to connect the computer apparatus to a wide area network such as the Internet, a mouse input device, or a scanner. The interconnection via system bus 745 allows the central processor 743 to communicate with each subsystem and to control the execution of instructions from system memory 742 or the fixed disk 749, as well as the exchange of information between subsystems. The system memory 742 and/or the fixed disk 749 may embody a computer accessible medium.

As described, the techniques provided herein may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer accessible medium, such as a random access memory (RAM), a read-only memory (ROM), a magnetic medium such as a hard-drive or a floppy disk, or an optical medium such as a CD-ROM. Any such computer accessible medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A load sensing apparatus for determining a volume of a substance in a flexible storage container, the load sensing apparatus comprising:
   a first plurality of load-sensitive sensors arranged in at least a region of a first footprint of the flexible storage container,
   wherein the region is external to a second footprint of the flexible storage container, the first footprint corresponds to an empty state of the flexible storage container, the second footprint corresponds to a full state of the flexible storage container, and the flexible storage container retracts from the first footprint to the second footprint that is smaller than the first footprint when the flexible storage container is filled; and a second plurality of load-sensitive sensors arranged within the second footprint, wherein a first spacing between an adjacent pair of load-sensitive sensors in the first plurality of load-sensitive sensors is less than a second spacing between an adjacent pair of load-sensitive sensors in the second plurality of load-sensitive sensors, and wherein sensor data from the first plurality of load-sensitive sensors and the second plurality of load-sensitive sensors are used to determine a volume of a substance in the flexible storage container.

2. The load sensing apparatus of claim 1, wherein the first plurality of load-sensitive sensors includes a set of presence sensors arranged on a line intersecting with an edge of the second footprint.

3. The load sensing apparatus of claim 1, wherein the second plurality of load-sensitive sensors includes at least one load-sensitive sensor proximate to each corner of the second footprint.

4. The load sensing apparatus of claim 1, wherein the second plurality of load-sensitive sensors includes a set of load-sensitive sensors proximate to each edge of the second footprint.

5. The load sensing apparatus of claim 1, wherein the second plurality of load-sensitive sensors includes a first set of load-sensitive sensors arranged substantially along a first axis of symmetry of the second footprint.

6. The load sensing apparatus of claim 5, wherein the second plurality of load-sensitive sensors includes a second set of load-sensitive sensors arranged substantially along a second axis of symmetry of the second footprint.

7. The load sensing apparatus of claim 5, wherein the first plurality of load-sensitive sensors are arranged substantially along the first axis of symmetry extending from the second footprint.

8. The load sensing apparatus of claim 1, wherein the second plurality of load-sensitive sensors includes a first pair of linearly arranged sets of load-sensitive sensors substantially parallel to a first axis of symmetry of the second footprint.

9. The load sensing apparatus of claim 8, wherein the second plurality of load-sensitive sensors includes a second pair of linearly arranged sets of load-sensitive sensors substantially parallel to a second axis of symmetry of the second footprint.

10. The load sensing apparatus of claim 1, wherein the second plurality of load-sensitive sensors includes a set of linearly arranged load sensitive sensors, and a spacing between adjacent load-sensitive sensors in the set of linearly arranged load sensitive sensors decreases as a distance away from a center of the second footprint increases.

11. A system comprising:

the load sensing apparatus of claim 1;

a data collection unit for collecting the sensor data from the first and second pluralities of load-sensitive sensors of the load sensing apparatus; and a data processing unit for computing the volume of the substance using the sensor data.

12. The system of claim 11, wherein the data processing unit computes the volume of the substance by determining a pressure level profile of the flexible storage container using at least the sensor data from the second plurality of load-sensitive sensors, calculating a weight of the substance using the pressure level profile, and calculating a volume of the substance using the weight and density of the substance.

13. The system of claim 12, wherein the data processing unit determines a dynamic footprint of the flexible storage container using the sensor data from the first plurality of load-sensitive sensors.

14. The system of claim 13, wherein the data processing unit calculates the weight of the substance by determining an average pressure of the flexible storage container using the pressure level profile, and multiplying the average pressure with a surface area of the dynamic footprint.

15. The system of claim 13, wherein the data processing unit calculates the weight of the substance by integrating the pressure level profile over an incremental surface area coverage of each load-sensitive sensor.

* * * * *